United States Patent Office

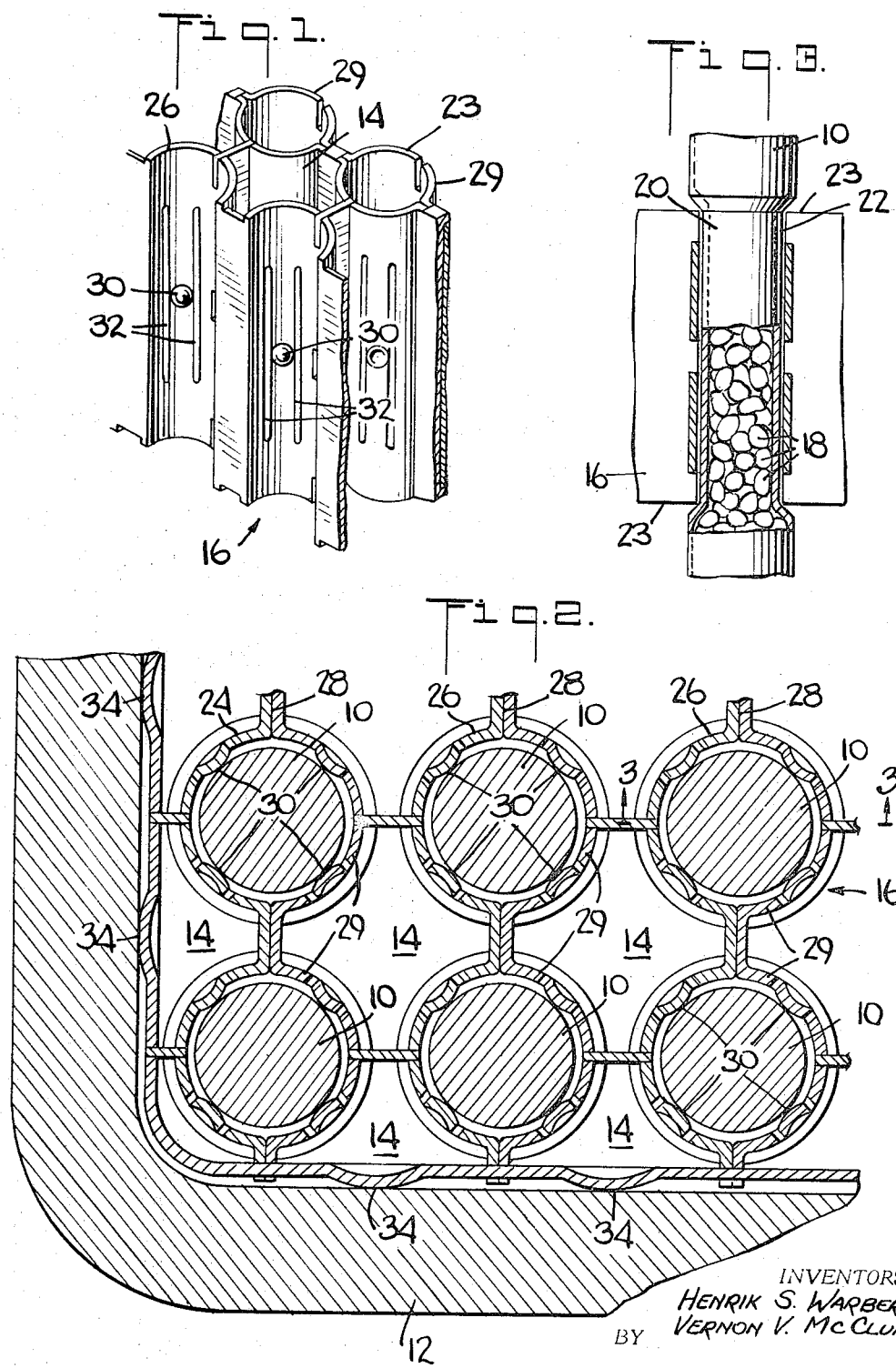

3,350,276
Patented Oct. 31, 1967

3,350,276
SECTIONAL SUPPORT GRID FOR INTERMITTENTLY NECKED-DOWN FUEL PINS
Henrik S. Warberg, Dearborn, and Vernon V. McClure, St. Clair Shores, Mich., assignors to Atomic Power Development Associates, Inc., Detroit, Mich., a corporation of New York
Filed Oct. 7, 1965, Ser. No. 493,625
4 Claims. (Cl. 176—78)

This invention relates to nuclear reactors and more particularly to a new and improved grid structure for securing fuel rods within a nuclear reactor. The invention is particularly useful in nuclear reactors embodying solid type nuclear fuel.

Briefly, the present invention contemplates the provision of a new and improved nuclear reactor fuel assembly comprising a wrapper tube containing a plurality of elongated fuel rods, and a support grid for holding the fuel members in parallel, equally spaced relationship with respect to each other. Each of the fuel rods has a portion axially necked-down to a smaller diameter, and a substantial portion of the grid assembly is disposed within this portion.

An important feature of the invention resides in the provision of a new and improved nuclear reactor fuel element assembly which effectively supports each individual fuel element and which provides proper spacing therebetween.

As another feature of this invention, there is provided a nuclear reactor fuel element assembly which is far superior to existing fuel element assemblies, which has a lower pressure drop through the reactor core, thereby allowing a closer spacing of the fuel rods and more fuel per element or conversely a smaller pump and primary piping, and which provides maximum free flow paths to minimize potential plugging from particles in the coolant.

Another feature of this invention is the provision of a nuclear reactor fuel element assembly which rigidly holds the fuel rods in position in the wrapper tube, which prevents slumping of the fuel pins, which restrains the fuel material from moving longitudinally within the fuel tube caused by ratcheting or slumping, which restrains the fuel rods from longitudinal movement due to coolant flow effects and thermal bowing, which allows the fuel rods to expand radially and to slide longitudinally inside the wrapper tube as they change in length due to thermal and nuclear effects, and which accurately maintains a gripping force on the fuel rods throughout the full range of their expansion.

Still another feature of this invention resides in the provision of a new and improved fuel element assembly which allows the coolant to contact substantially all of the fuel rod surface, and thereby substantially eliminate the possibility of forming hot spots.

The present invention provides, as another feature thereof, a fuel element assembly which is rigid and strong in construction, which is economical to manufacture, and which is relatively simple to fabricate, and which automatically compensates for manufacturing tolerances.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

A specific embodiment of the invention has been chosen for purposes of illustration and description, and is shown in the accompanying drawings, forming a part of the specification, wherein:

FIG. 1 is a fragmentary perspective view of a grid assembly constructed according to this invention.

FIG. 2 is a fragmentary transverse sectional view showing the fuel rods gripped and secured in position by the grid assembly, all contained within a wrapper tube; and FIG. 3 is a longitudinal sectional view taken along line 3—3 of FIG. 2.

In the illustrated embodiment of the invention, fuel for a fast reactor is made in the form of closely spaced long slender rods 10, FIGS. 2 and 3, contained within larger structural tube elements such as wrapper tube 12, FIG. 2, which forms the primary coolant passageways 14.

These fuel rods 10 must be rigidly held in position laterally within the wrapper tube 12 to prevent movement due to either coolant flow effects or thermal bowing effects or due to a combination of both effects. However, provision must be made to allow for longitudinal and radial growth caused by differential thermal expansion and contained fission products. Ideally, this must be done while allowing fuel coolant contact with the surface of the fuel rod and without restricting the coolant flow passageways.

According to the invention, a plurality of longitudinally spaced lateral supports such as grid assembly 16 serve to retain the fuel rods 10 in parallel, spaced positions one with respect to the others. The longitudinal spacing of the lateral supports is determined as the maximum which will limit the fuel rod bowing, under the hydraulic and thermal forces, to that required for nuclear stability. Each of the fuel rods 10 may comprise a single fuel pin or it may comprise a tube filled with fuel in the form of slugs, powder, or pellets 18 in the lower portion, leaving a void space 20 above or below for containment of the gaseous fission products. The fuel rods 10 are necked down to a slightly smaller diameter at each lateral support as at 22, FIG. 3. When the fuel rods are formed by filling the tube with subdivided fuel, the necked-down sections 22 serve to prevent longitudinal movement by ratcheting or slumping of the fuel material within the tube. Also, the necked-down section serves to restrain the fuel rod 10 from longitudinal movement.

Each grid assembly 16 comprises separate end sections 24, FIG. 2, and interior section 26 which are interlocked one to the other as by means of brazing at 28 to form interconnected supporting rings 29 which surround the fuel rods 10 respectively for retaining in parallel substantially equally spaced relationship one with respect to the others as best seen in FIG. 2. It will be appreciated that the connections between the sections are located on the center lines of the fuel rod rows in order to facilitate the assembly. A plurality of inwardly directed indentations 30, FIGS. 1 and 2, are disposed on the inside surface of the supporting rings 29 for resiliently engaging the fuel rods 10. The indentations grip the fuel rods 10 and hold them securely while allowing the coolant to contact the fuel rod surface everywhere except at the point contacts of the indentations. Slots 32, FIG. 1, are disposed on both sides of the indentations 30 to allow the coolant to flow therethrough to assure coolant contact with the fuel rod. Further, the slots 32 act as a leaf spring so that continuous contact between the grid assembly 16 and the fuel rods 10 is assured and the gripping forces uniformly maintained throughout the full range of the fuel rod expansion. Moreover, the spring effect automatically takes care of the manufacturing tolerances of the fuel rod and support grid. That is, the resiliency of the spring action is sufficient to maintain point contact when the parts are manufactured within their ordinary tolerances.

After assembly of the end sections 24, interior sections 26 and the fuel rods 10 is completed, the entire assembly is introduced into the wrapper tube 12, FIG. 2, and is maintained in positon by the sidewalls of the wrapper tube as by means of dimples 34 which resiliently engage said wall. It will be appreciated that the grid assemblies are restrained against longitudinal movement by the indentations 30, FIGS. 1 and 2, engaging the fuel rods 10, and by edges 23 (FIGS. 1 and 3) thereof engaging the necked down sections 22, FIG. 3, of the fuel rods. However, the grid assemblies are allowed to slide longitudinally inside the wrapper tube 12 as the fuel rods change in length due to thermal and nuclear effects.

Further, according to the invention, the supporting ring 29 which is the largest portion of the support grid assembly 16 is disposed within the necked-down portion 22 of the fuel rods 10 so that a minimum amount of grid material is disposed in the primary coolant flow passageways 14. Accordingly, a maximum free flow path is provided which minimizes the chance of plugging thereof by solid particles carred by the coolant. Also, there is a relatively low pressure drop through the reactor core as compared to prior art such devices, which allows closer spacing of the fuel rods thereby permitting more fuel per element, or conversely, permitting a smaller coolant pump and piping.

From the foregoing description it will be seen that we contribute by our invention a new and improved nuclear reactor fuel element assembly which achieve all of the objects of the invention.

Although a particular embodiment of the invention is herein disclosed for purposes of explanation, modification thereof, after study of this specification, will be apparent to those skilled in the art to which the invention pertains. Reference should accordingly be had to the appended claims in determining the scope of the invention.

What is claimed and desired to be secured by Letters Patent is:

1. A nuclear reactor fuel assembly comprising a wrapper tube, a plurality of elongated fuel rods disposed in said wrapper tube, a grid assembly comprising a plurality of interconnected supporting rings which surround said fuel rods respectively for supporting said fuel rods in parallel substantially equally spaced relationship one with respect to the others, each of said fuel rods having a portion necked-down to a smaller diameter and a substantial portion of said supporting rings being disposed within the necked-down portions respectively, a plurality of inwardly directed indentations disposed on the inside surface of each of said supporting rings for resiliently engaging said fuel rods, and slot means disposed adjacent said indentations.

2. A nuclear reactor fuel assembly according to claim 1 wherein said plurality of inwardly directed indentations comprise four equally spaced indentations located on each supporting ring and wherein said slot means comprises one elongated extending slot disposed on each side of each of said indentations.

3. A nuclear reactor fuel assembly comprising a wrapper tube, a plurality of elongated fuel rods disposed in said wrapper tube, each of said fuel rods including a tube, subdivided solid material filling at least the central portion of said tube, said tube having a void space outwardly of said fuel material for containment of gaseous fission products, a grid assembly for supporting said fuel rods in parallel substantially equally spaced reationship one with respect to the others, each fuel rod having a portion necked-down to a smaller diameter and a substantial portion of said grid assembly being disposed within the necked-down portions.

4. A nuclear reactor fuel assembly comprising a wrapper tube, a plurality of elongated fuel rods disposed in parallel rows in said wrapper tube, each of said fuel rods comprising a tube, subdivided solid fuel material filling at least the central portion of said tube, said tube having a void space outwardly of said fuel material for containment of gaseous fission products, a grid assembly comprising a plurality of separate sections, said sections being interconnected along the centerlines of the fuel rod rows, said grid assembly when assembled comprising a plurality of interconnected supporting rings which surround said fuel rods respectively for supporting said fuel rods in parallel substantially equally spaced relationship one with respect to the others, said grid assembly having a plurality of spaced outwardly extending dimples engaging the inside wall of said wrapper tube, a plurality of inwardly directed indentations disposed on the inside surface of said support rings for resiliently engaging said fuel rods, slot means disposed adjacent said indentations, each of said fuel rods having a portion necked-down to a smaller diameter and a substantial portion of said supporting rings being disposed within the necked-down portions, respectively.

References Cited

UNITED STATES PATENTS

| | | | |
|---|---|---|---|
| 3,125,493 | 3/1964 | D'Amore | 176—76 |
| 3,128,235 | 4/1964 | Hackney et al. | 176—78 X |
| 3,163,583 | 12/1964 | Widmer et al. | 176—76 X |
| 3,164,529 | 1/1965 | Waine et al. | 176—78 X |
| 3,228,854 | 1/1966 | Bekkering et al. | 176—78 |
| 3,230,146 | 1/1966 | Astley et al. | 176—78 X |
| 3,231,476 | 1/1966 | Thome | 176—78 |
| 3,255,090 | 6/1966 | Leirvik | 176—76 |

FOREIGN PATENTS

| | | |
|---|---|---|
| 651,277 | 10/1962 | Canada. |
| 632,602 | 1/1962 | Italy. |

L. DEWAYNE RUTLEDGE, *Primary Examiner.*

BENJAMIN R. PADGETT, *Examiner.*

M. J. SCOLNICK, *Assistant Examiner.*